(12) United States Patent
Xu et al.

(10) Patent No.: US 8,909,411 B2
(45) Date of Patent: Dec. 9, 2014

(54) SLIP RATE DETECTION METHOD AND DETECTION SYSTEM FOR ELECTRIC VEHICLE

(75) Inventors: Guoqing Xu, Shenzhen (CN); Kun Xu, Shenzhen (CN)

(73) Assignee: Shenzhen Institutes of Advanced Technology, Chinese Academy of Sciences, Shenzhen, Guangdong Province (CN)

( * ) Notice: Subject to any disclaimer, the term of this patent is extended or adjusted under 35 U.S.C. 154(b) by 0 days.

(21) Appl. No.: 13/990,125

(22) PCT Filed: Jul. 29, 2011

(86) PCT No.: PCT/CN2011/001246
§ 371 (c)(1),
(2), (4) Date: May 29, 2013

(87) PCT Pub. No.: WO2012/071776
PCT Pub. Date: Jun. 7, 2012

(65) Prior Publication Data
US 2013/0253755 A1    Sep. 26, 2013

(30) Foreign Application Priority Data

Nov. 29, 2010    (CN) .......................... 2010 1 0562956

(51) Int. Cl.
*G01M 17/00* (2006.01)
*G06F 17/00* (2006.01)
*B60L 3/10* (2006.01)
*B60L 11/18* (2006.01)

(52) U.S. Cl.
CPC . *G06F 17/00* (2013.01); *B60L 3/10* (2013.01); *B60L 11/1803* (2013.01); *B60L 2240/421* (2013.01); *B60L 2240/427* (2013.01); *B60L 2240/429* (2013.01); *Y02T 10/642* (2013.01); *Y02T 10/70* (2013.01); *Y02T 10/7005* (2013.01); *B60L 2220/14* (2013.01); *B60L 2240/423* (2013.01)
USPC ....................................................... 701/29.1

(58) Field of Classification Search
CPC ..................... B60L 2240/423; B60L 2240/486
USPC ....................................................... 701/29.1
See application file for complete search history.

(56) References Cited

U.S. PATENT DOCUMENTS

| | | | |
|---|---|---|---|
| 8,139,108 B2 * | 3/2012 | Stratton et al. ................. | 348/114 |
| 2008/0180523 A1 * | 7/2008 | Stratton et al. ................. | 348/114 |
| 2009/0177337 A1 * | 7/2009 | Yu et al. ......................... | 701/2 |

\* cited by examiner

*Primary Examiner* — Hussein A. Elchanti
(74) *Attorney, Agent, or Firm* — Osha Liang LLP

(57) ABSTRACT

A slip rate detection method and a detection system for detecting the slip rate of an electric vehicle using the method. The slip rate of an electric vehicle is measured by measuring the motor voltage, motor current, and motor rotational speed of the drive motor. The detection system includes a motor rotational speed detection unit, a motor voltage detection unit, and a motor current detection unit, all connected to the drive motor. The motor rotational speed detection unit, the motor voltage detection unit, and the motor current detection unit are connected to a slip rate calculation unit by means of a motor rotational speed signal processing unit, a voltage signal processing unit, and a current signal processing unit, respectively. The slip rate calculation unit is configured with a slip rate calculation formula. The formula is determined according to the drive motor type.

6 Claims, 6 Drawing Sheets

SLIP RATE DETECTION METHOD AND DETECTION SYSTEM FOR ELECTRIC VEHICLE

CROSS REFERENCE TO RELATED APPLICATIONS

This is a national stage application based on PCT/CN2011/001246, filed on Jul. 29, 2011, which claims priority to Chinese Patent Application No. 201010562956.2, filed on Nov. 29, 2010. This application claims the priority of these prior applications and incorporates their disclosures by reference in their entireties.

FIELD OF THE INVENTION

The invention relates to a slip rate calculation method and a detection system, and in particular to a slip rate measurement system for an electric vehicle.

BACKGROUND OF THE INVENTION

The slip rate of a vehicle refers to the proportion of a sliding component in wheel movement and is represented as δ. The calculation formula is δ=(v−wr)/v×100%, wherein v represents the running speed of the vehicle on the ground (m/s); r represents the wheel rolling radius (m); and w represents the wheel angular speed (rad/s). As an important parameter, the slip rate is widely applied to vehicle control systems, and the slip rate needs to be kept within the range of 15%-20% in order to ensure the optimal braking effect, for example. As the slip rate is used to some extent in many cases, it is also very important to accurately measure the slip rate.

Currently, there are two types of commonly used slip rate detection methods for electric vehicles. In the first type of methods, the slip rate when the vehicle is operating is obtained by detecting the speeds of driving wheels and driven wheels of the vehicle, and the principle is replacing the wheel linear speed with the driving wheel speed, and replacing the vehicle speed with the driven wheel speed. Such a method is easy to implement, and currently adopted in most slip rate detection. However, the method needs mounting high-precision velocity sensors or acceleration sensors on the driving wheels and the driven wheels, and with the mounting of the sensors, not only can the system performance be reduced, but also as such a sensor usually uses an encoder for the implementation by counting impulse signals, not only does relay occur, but also the accuracy is affected and restricted by the resolution of the encoder. In addition, the method is only suitable for two-wheel drive vehicles, and can not be used for four-wheel drive vehicles due to lack of driven wheels, thus having limitation. For this reason, China patent document CN100480664C discloses a testing method for motion parameters of an all-wheel drive electric vehicle comprising the steps of: firstly, calculating the total ground longitudinal force and the full vehicle acceleration using wheel speed signals of the wheels and torque signals of the drive motors, and expressing the full vehicle speed using the rotational speed as well as the skid ratio and the slip rate of non-steering wheels; then substituting the above results into a differential equation of the slip rate of the non-steering wheels; and finally calculating the slip rate of the non-steering wheels by integration, and reversely deriving the full vehicle speed, and then calculating the slip rate of steering wheels. However, the method uses external drive torque and the wheel speed, and needs mounting a torque sensor in practical use, thus still having the problem about delay and accuracy resulting from the sensor; and the technical solution is only directed to all-wheel drive electric vehicles, and can not be applied to two-wheel drive vehicles, thus having limitation in use.

The other type of methods are slip rate calculation methods that do not need mounting a vehicle speed sensor; for example, a method for estimating the slip rate using the characteristic that ground change results in changes of other physical quantities is given in a dissertation titled Advanced Estimation Techniques of Road Surface Condition and Their Experimental Evaluation using Test Electric Vehicle 'UOT March I and II" written by Kimihisa and Yoichi Hori; however, in the method, the system transfer characteristic from the rotational speed to the drive force is analyzed by adopting the Fourier transform, and then the change of road surface condition is analyzed; and as the spectrum analysis is complex in calculation and consumes relatively long time, the method is poor in real-time property, and relative difficult to implement. Patent US2009/0210128A1 discloses a method of obtaining the slip rate by resolving a state equation of slip rate, which is, estimating the slip rate from the wheel drive torque and rotational speed; and the method, however, needs additionally mounting a torque sensor, which is relatively high in cost, and the accuracy and reliability can also be affected.

In summary, all the slip rate calculation methods of the prior arts have the problem of being poor in real-time property.

SUMMARY OF THE INVENTION

In view of the forgoing, the invention aims at solving technical problems of calculation delay, complexity of calculation methods, and poor real-time property resulting from the mounting of a sensor needed by the slip rate detection methods in the prior art, and thus propose a testing method without delay and capable of accurately measuring the slip rate in real time and simultaneously applicable to two-wheel and four-wheel drive electric vehicles.

To solve the above technical problems, the invention provides a slip rate detection method of a DC motor driven electric vehicle, comprising the following steps:

(1) measuring the voltage, current and rotational speed of a drive motor to obtain the armature voltage $U_a$, the armature current $i_a$, and the motor rotational speed $\omega_m$ of the drive motor;

(2) obtaining motor coefficients of the drive motor, including the motor inductance $L_a$, the armature resistance $R_a$, the motor torque coefficient $k_m$, and the motor back electromotive force coefficient $k_e$;

(3) obtaining full vehicle constants, including the full vehicle mass M, the wheel radius r, the wheel rotational inertia J, and the transmission ratio a; and (4) obtaining the slip rate according to the slip rate calculation formula as shown below:

$$\lambda(t_2) = \left(1 + \frac{J}{r^2 M}\right)\left[1 - \frac{\omega_m(t_1)}{\omega_m(t_2)}\right] - \frac{a^2 \cdot k_m}{r^2 M R_a \omega_m(t_2)}$$
$$\left\{\int_{t_1}^{t_2} U_a dt - k_e \int_{t_1}^{t_2} \omega_m dt - L_a \cdot [i_a(t_2) - i_a(t_1)]\right\} + \frac{\lambda(t_1)\omega_m(t_1)}{\omega_m(t_2)}$$

wherein $t_1$ is a first measurement time; $t_2$ is a second measurement time; and λ is the slip ratio.

A slip rate detection method for an electric vehicle driven by a permanent magnet synchronous motor, comprising the following steps:

(1) measuring the voltage, current, and rotational speed of the drive motor, to obtain the motor speed $\omega_m$, as well as the voltage $U_q$ of the drive motor in a $d_q$ coordinate system, and the armature current $i_q$ of the drive motor in the $d_q$ coordinate system;

(2) obtaining motor coefficients of the drive motor, including the components $L_d$ and $L_q$ of the stator inductance of the drive motor in the $d_q$ coordinate system, the stator resistance $R_s$ of the drive motor, the flux linkage $\psi_f$ generated by a permanent magnet of the drive motor, and the number of pole pairs $n_p$ of the drive motor;

(3) obtaining full vehicle constants, including the mass M, the wheel radius r, the wheel rotational inertia J, and the transmission ratio a; and (4) calculating the slip rate according to the slip rate calculation formula as shown below:

$$\lambda(t_2) = \left(1 + \frac{J}{r^2 M}\right)\left[1 - \frac{\omega_m(t_1)}{\omega_m(t_2)}\right] - \frac{a^2 \cdot k_m}{r^2 M R_a \omega_m(t_2)}$$
$$\left\{\int_{t_1}^{t_2} U_a dt - k_e \int_{t_1}^{t_2} \omega_m dt - L_a \cdot [i_a(t_2) - i_a(t_1)]\right\} + \frac{\lambda(t_1)\omega_m(t_1)}{\omega_m(t_2)}$$

wherein $k_{m1} = n_p[\psi_f + (L_d - L_q)]$; $t_1$ is a first measurement time; $t_2$ is a second measurement time; and $\lambda$ is the slip rate.

A slip rate detection system comprises a motor rotational speed detection unit, a motor voltage detection unit and a motor current detection unit, all connected with a drive motor, wherein the motor rotational speed detection unit, the motor voltage detection unit and the motor current detection unit are connected with a slip rate calculation unit by means of a motor rotational speed signal processing unit, a voltage signal processing unit and a current signal processing unit, respectively; and the slip rate calculation unit is configured with a slip rate calculation formula, which is determined according to the type of the drive motor.

The slip rate calculation unit also stores motor coefficients of the drive motor and full vehicle constants.

The full vehicle constants include the full vehicle mass M, the wheel radius r, the wheel rotational inertia J, and the transmission ratio a.

The drive motor is a DC motor, and the motor coefficients include the motor inductance $L_a$, the motor torque coefficient $k_m$, the motor back electromotive force coefficient $k_e$ and the armature resistance $R_a$.

The voltage value detected by the motor voltage detection unit is a motor bus voltage, and the voltage signal processing unit is a signal conditioning unit; and the current value detected by the motor current detection unit is a motor current value, and the current signal processing unit is a signal conditioning unit.

The drive motor is a permanent magnet synchronous motor; and motor coefficients include the components $L_d$ and $L_q$ of the stator inductance of the drive motor in the dq coordinate system, the stator resistance $R_s$ of the drive motor, the flux linkage $\psi_f$ generated by a permanent magnet of the drive motor, and the number of pole pairs $n_p$ of the drive motor.

The voltage value detected by the motor voltage detection unit is a motor line voltage, and the voltage signal processing unit comprises a signal conditioning unit and a voltage transformation unit; and the current value detected by the motor current detection unit is a motor phase current value, and the current signal processing unit comprises a signal conditioning unit and a current transformation unit.

Compared with the prior art, the above technical solution of the invention has the following advantages:

(1) The slip rate detection method of the electric vehicle of the invention uses rotational speed, voltage and current information which are required to be detected by a drive motor control system of a electric vehicle, without the necessity of measuring vehicle speed information, and thus does not need an expensive velocity sensor, thereby avoiding the problem that the slip rate calculation accuracy depends upon the accuracy of the sensor, meanwhile, being without limitation to two-wheel drive motors, so as to have a wide application range; the detection method is simple, and the measured parameters can be obtained in real time by detection, thus improving the reliability of detection results, so the method not only has the effect of being prone to real-time detection, but also has the advantage of being prone to digital realization; in addition, as to the slip rate detection system for the electric vehicle of the invention, in the calculation process of the detection method, the convergence of the system is ensured with the voltage equation, so the problem of convergence does not need to be considered in the calculation; moreover, in the method, integration operation does not need to be conducted separately on variables difficult to integrate, such as the slip rate, so the method is simple in calculation, fast in speed and easy to implement; furthermore, in the slip rate detection method of the electric vehicle of the invention, the slip rate is detected using the motor internal physical quantities, which is beneficial to integrating slip rate related detection and control into a motor controller, so as to realize more accurate and faster control.

(2) In the slip rate detection method for the electric vehicle of the invention, it only needs to measure rotational speed, voltage and current information of the motor to achieve detection of the slip rate, regardless of the drive motor being a DC motor or a permanent magnet synchronous motor, and rest parameters in the calculation process are all inherent constants of the drive motor and the vehicle themselves, which rest parameters may vary in terms of types of drive motors, but the information needed to be measured in real time is rotational speed, voltage and current information of the motor in each case, so the measurement is not only simple, but also accurate and timely.

(3) The slip rate detection system of the electric vehicle of the invention comprises a motor rotational speed detection unit, a motor voltage detection unit and a motor current detection unit, all connected with the drive motor, which are connected with the slip rate calculation unit by means of a motor rotational speed signal processing unit, a voltage signal processing unit and a current signal processing unit, respectively, and the slip rate calculation unit is configured with a slip rate calculation formula, so the detection system is simple in structure; and as the motor internal physical quantities are used to detect the slip rate, a torque sensor is not used with respect to the prior art, which not only avoids the problem that the accuracy of the sensor affects the slip rate detect result, but also makes it possible to integrate the detection and control related to the slip rate into the motor controller, and as the motor time constant of a motor is generally only several milliseconds, more accurate and faster control can be achieved.

(4) In the slip rate detection system of the electric vehicle of the invention, the slip rate calculation unit also stores the motor coefficients of the drive motor and the full vehicle constants, and as the internal parameters of different types of motors and different vehicles are different, setting can be made for the required internal parameters, so that the detect system has wide applicability.

(5) In the slip rate detection system of the electric vehicle of the invention, the values detected by the motor voltage detection unit and the motor current detection unit are different, and the signal processing modes in the current signal processing unit and the voltage signal processing unit are different, according to different types of drive motors of electric vehicles, and thus it only needs to make setting according to the type of the drive motor of the electric vehicle, so that the system is simple and convenient to use.

DESCRIPTION OF THE DRAWINGS

In order for the content of the invention to be more readily understood clearly, the invention will be further described in details according to the particular embodiments of the invention in conjunction with the drawings, in which.

Figure 1:
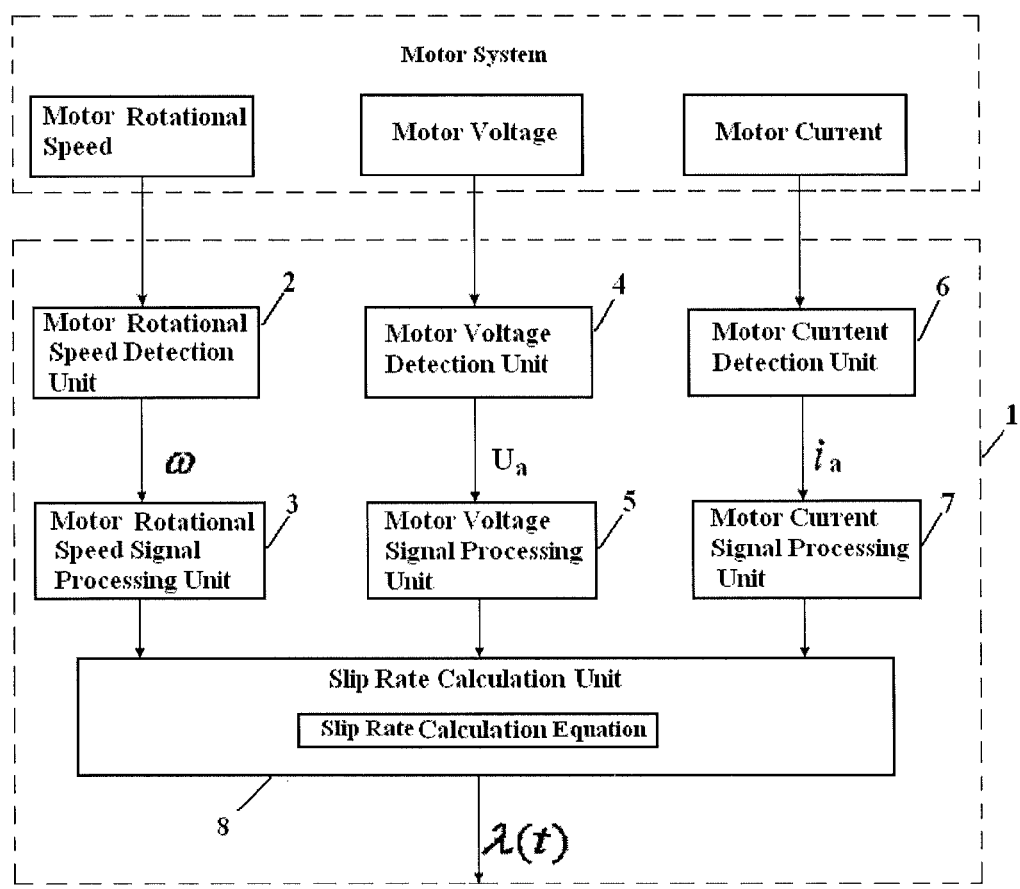
FIG. 1 is a modular block diagram of a slip rate detection system of an electric vehicle of the invention.

Reference numerals in the drawings are as follows: 1—slip rate calculation module, 2—motor rotational speed detection unit, 3—motor rotational speed signal processing unit, 4—motor voltage detection unit, 5—motor voltage signal processing unit, 6—motor current detection unit, 7—motor current signal processing unit, 10—motor controller, 11—DC motor, 13—permanent magnet synchronous motor, 14—current integration unit, 15—proportionality coefficient, 16—adder, 17—calculation unit, 18—constant, 91—DC chopper, 92—three-phase inverter, 51—signal conditioning unit, 52—voltage transformation unit, 71—signal conditioning unit, and 72—current transformation unit.

DETAILED DESCRIPTION OF THE EMBODIMENTS

Embodiment 1

In the embodiment, a drive motor of an electric vehicle is a DC motor, and the slip rate detection principle will be described below.

A slip rate detection method for the DC motor driven electric vehicle comprises the steps of:

(1) measuring the voltage, current and rotational speed of a drive motor to obtain armature voltage $U_a$, armature current $i_a$, and motor rotational speed $\omega_m$ of the drive motor;

(2) obtaining motor coefficients of the drive motor, including the motor inductance $L_a$, armature resistance $R_a$, motor torque coefficient $k_m$, and motor back electromotive force coefficient $k_e$;

(3) obtaining full vehicle constants, including full vehicle mass M, wheel radius r, wheel rotational inertia J, and transmission ratio a; and (4) obtaining slip rate according to a slip rate calculation formula as shown below:

$$\lambda(t_2) = \left(1 + \frac{J}{r^2 M}\right)\left[1 - \frac{\omega_m(t_1)}{\omega_m(t_2)}\right] - \frac{a^2 \cdot k_m}{r^2 M R_a \omega_m(t_2)}$$

$$\left\{ \int_{t_1}^{t_2} U_a dt - k_e \int_{t_1}^{t_2} \omega_m dt - L_a \cdot [i_a(t_2) - i_a(t_1)] \right\} + \frac{\lambda(t_1)\omega_m(t_1)}{\omega_m(t_2)}$$

wherein $t_1$ is a first measurement time, $t_2$ is a second measurement time, and $\lambda$ is the slip rate; and in the above step (4), the derivation process of the slip rate calculation formula is as follows:

Here take a separate excitation DC motor model as an example.

The motor torque is:

$$T_m = k_m \cdot i_a \qquad (1\text{-}1)$$

the voltage equation is $$L_a \frac{di_a}{dt} + R_o i_a + E_a = U_a; \qquad (1\text{-}2)$$

and the back electromotive force is represented as $$E_o = k_e \omega_M \qquad (1\text{-}3)$$

If the speed reducing ratio is a, then $$\omega_W = \frac{1}{a}\omega_M \qquad (1\text{-}4)$$

$$T = a \cdot T_m; \qquad (1\text{-}5)$$

With the vehicle resistance being ignored, the equation of vehicle motion is $$F_d = M \frac{dV_{vehicle}}{dt} \qquad (1\text{-}6)$$

$$T - F_d \cdot r = J \frac{d\omega_W}{dt} = J \frac{1}{a} \frac{d\omega_M}{dt}.$$

In the formula, $i_a$—armature current, $R_a$—armature resistance, $k_m$—torque coefficient, $k_e$—back electromotive force coefficient, $U_a$—armature voltage, $E_a$—back electromotive force, T—traction torque, $T_m$—motor torque, a—transmission ratio, $\omega_w$—wheel rotational speed, $\omega_M$—motor rotational speed, $L_a$—motor inductance, $F_d$—driving force, $V_{vehicle}$—vehicle speed, r—wheel radius, J—wheel rotational inertia, M—full vehicle mass.

With $t_1$ as the first measurement time, and $t_2$ as the second measurement time, integrating the voltage equation, and manipulating the equation, we can obtain $$\int_{t1}^{t2} i_a(t)dt = \frac{1}{R_a}\left\{\int_{t1}^{t2} U_a dt - k_e \int_{t1}^{t2} \omega_M dt - L_a \cdot [i_a(t_2) - i_a(t_1)]\right\} \quad (1\text{-}7)$$

Differentiating the slip rate according to the definition of the slip rate in accelerating condition $$\lambda = \frac{\omega_M r - V_{vehicle}}{\omega_M r} \times 100\%,$$

and the vehicle longitudinal kinetic equation (1-6), we get $$\dot\lambda = -\frac{\dot\omega_M}{\omega_M}\lambda + \left(1 + \frac{J}{r^2 M}\right)\frac{\dot\omega_M}{\omega_M} - \frac{k_m i_a \cdot a}{r^2 M \omega_M} \quad (1\text{-}8)$$

Rearranging the above formula, we can obtain $$(\lambda \omega_M)' = \left(1 + \frac{J}{r^2 M}\right)\omega_M^* - \frac{k_m a}{r^2 M} \cdot i_a \quad (1\text{-}9)$$

Integrating the above formula (9) in the interval $(t_1, t_2)$, and substituting into the current integrating formula (7), we can obtain the slip rate calculation formula $$\lambda(t_2) = \left(1 + \frac{J}{r^2 M}\right)\left[1 - \frac{\omega_M(t_1)}{\omega_M(t_2)}\right] - \quad (1\text{-}10)$$

$$\frac{a^2 \cdot k_m \int_{t1}^{t2} i_a dt}{r^2 M \omega_M(t_2)} + \frac{\lambda(t_1)\omega_M(t_1)}{\omega_M(t_2)}$$

$$= \left(1 + \frac{J}{r^2 M}\right)\left[1 - \frac{\omega_M(t_1)}{\omega_M(t_2)}\right] - \frac{a^2 \cdot k_m}{r^2 M R_a \omega_M(t_2)}$$

$$\left\{\int_{t1}^{t2} U_a dt - k_e \int_{t1}^{t2} \omega_M dt - L_a \cdot [i_a(t_2) - i_a(t_1)]\right\} +$$

$$\frac{\lambda(t_1)\omega_M(t_1)}{\omega_M(t_2)}$$

After discretization, we get $$\lambda(k+1) = \left(1 + \frac{J}{r^2 M}\right)\left[1 - \frac{\omega_M(k)}{\omega_M(k+1)}\right] - \frac{a^2 \cdot k_m}{r^2 M R_a \omega_M(k+1)} \cdot \quad (1\text{-}11)$$

$$\left\{\frac{T}{2}[U_a(k) + U_a(k+1)] - k_e \frac{T}{2}[\omega_M(k) + \omega_M(k+1)] - \right.$$

$$\left. L_a \cdot [i_a(k+1) - i_a(k)]\right\} + \frac{\lambda(k)\omega_M(k)}{\omega_M(k+1)}$$

Wherein $$\int_{t1}^{t2} \omega_M(t)dt = \Delta\theta = \frac{T}{2}[\omega_M(k) + \omega_M(k+1)], t_2 - t_1 = T$$

Obviously, the initial condition when t=0 is $$\begin{cases} \lambda(t)\omega_M(t)|_{t=0} = \omega_M(t)|_{t=0} = 0 \\ i(t)|_{t=0} = 0 \end{cases} \quad (1\text{-}12)$$

From above it can be seen that the value of the slip rate of the electric vehicle at any time can be obtained by means of discretization according to the initial condition.

Embodiment 2

A slip rate detection method of an electric vehicle driven by a permanent magnet synchronous motor comprises the steps of:

(1) measuring voltage, current, and rotational speed of a drive motor, to obtain motor rotational speed $\omega_m$, as well as voltage $U_q$ of the drive motor in a dq coordinate system, and the armature current $i_q$ of the drive motor in a dq coordinate system;

(2) obtaining motor coefficients of the drive motor, including components $L_d$ and $L_q$ of stator inductance of the drive motor in the dq coordinate system, stator resistance $R_s$ of the drive motor, flux linkage $\psi_f$ generated by a permanent magnet of the drive motor, and the number of pole pairs $n_p$ of the drive motor;

(3) obtaining full vehicle constants, including mass M, wheel radius r, wheel rotational inertia J, and transmission ratio a;

(4) calculating slip rate according to the slip rate calculation formula as shown below:

$$\lambda(t_2) = \left(1 + \frac{J}{r^2 M}\right)\left[1 - \frac{\omega_m(t_1)}{\omega_m(t_2)}\right] - \frac{a^2 \cdot k_{m1}}{r^2 M R_s \omega_m(t_2)}$$

$$\left\{\int_{t1}^{t2} u_q dt - \psi_f \int_{t1}^{t2} \omega_m dt - L_q \cdot [i_q(t_2) - i_q(t_1)]\right\} + \frac{\lambda(t_1)\omega_m(t_1)}{\omega_m(t_2)}$$

wherein $k_{m1} = n_p[\psi_f + (L_d - L_q)]$; $t_1$ is a first measurement time; $t_2$ is a second measurement time; and $\lambda$ is the slip rate.

In the step (4), the derivation process of the slip rate calculation formula of the electric vehicle whose drive motor is the permanent magnet synchronous motor is as follows:

when the vector control way of $i_d$=0 is adopted, the voltage equation in the dq coordinate system is $$u_d = -\omega_M L_q i_q \quad (2\text{-}1)$$

$$u_q = R_s i_q + L_q \frac{di_q}{dt} + \omega_M \psi_f$$

and the torque equation is $$T_e = n_p[\psi_f i_q + (L_d - L_q)i_d i_q] = n_p[\psi_f + (L_d - L_q)i_d]i_q = k_{m1} \cdot i_q \quad (2\text{-}2)$$

In the above formula,
$u_d$, $u_q$—motor voltage in the dq coordinate system;
$i_q$, $i_d$—motor current in the dq coordinate system;
$\omega_M$—motor rotational speed of the drive motor;
$T_e$—motor torque of the drive motor;
$R_S$—stator resistance;
$\psi_f$—flux linkage generated by the permanent magnet;
$n_p$—number of pole pairs of the drive motor;
$L_d$, $L_q$—components of the motor inductance of the drive motor in the dq coordinate;
$k_{m1}$—equivalent variable.

It can be seen the torque equation (2-2) and the voltage equation (2-1) of the permanent magnet synchronous motor in the dq coordinate system is the same as those of the DC motor in form, and thus in the calculation formula, it only needs to replace $i_a$ with $i_q$, replace $k_m$ with $k_{m1}$, and replace $k_e$ with $\psi_f$.

However, the voltage and current processing ways in the two cases are different, and for the permanent magnet synchronous motor, what is measured is the three-phase current and voltage of the motor, which need to be converted to the current and the voltage under the dq coordinate through current transformation and voltage transformation, and the conversion formula are as follows:

$$\begin{pmatrix} u_d \\ u_q \end{pmatrix} = \sqrt{\frac{2}{3}} \begin{pmatrix} \cos\theta_r & \cos\left(\theta_r - \frac{2\pi}{3}\right) & \cos\left(\theta_r + \frac{2\pi}{3}\right) \\ -\sin\theta_r & -\sin\left(\theta_r - \frac{2\pi}{3}\right) & -\sin\left(\theta_r + \frac{2\pi}{3}\right) \end{pmatrix} \begin{pmatrix} u_a \\ u_b \\ u_c \end{pmatrix} \quad (2\text{-}3)$$

$$\begin{pmatrix} i_d \\ i_q \end{pmatrix} = \sqrt{\frac{2}{3}} \begin{pmatrix} \cos\theta_r & \cos\left(\theta_r - \frac{2\pi}{3}\right) & \cos\left(\theta_r + \frac{2\pi}{3}\right) \\ -\sin\theta_r & -\sin\left(\theta_r - \frac{2\pi}{3}\right) & -\sin\left(\theta_r + \frac{2\pi}{3}\right) \end{pmatrix} \begin{pmatrix} i_a \\ i_b \\ i_c \end{pmatrix} \quad (2\text{-}4)$$

Similar to the processing method of the DC motor, integrating the equation with $u_q$ on both sides and manipulating the equation, we can obtain $$\int_{t_1}^{t_2} i_q(t)dt = \frac{1}{R}\left\{\int_{t_1}^{t_2} u_q dt - \psi_f \int_{t_1}^{t_2} \omega_M(t)dt - L_q[i_q(t_2) - i_q(t_1)]\right\} \quad (2\text{-}5)$$

Whereby substituting into the slip rate calculation formula (1-10), we can obtain the following slip rate calculation formula of the permanent magnet synchronous motor $$\lambda(t_2) = \left(1 + \frac{J}{r^2 M}\right)\left[1 - \frac{\omega_m(t_1)}{\omega_m(t_2)}\right] - \frac{a^2 \cdot k_{m1}}{r^2 MR_s \omega_m(t_2)} \quad (2\text{-}6)$$

$$\left\{\int_{t_1}^{t_2} u_q dt - \psi_f \int_{t_1}^{t_2} \omega_m dt - L_q \cdot [i_q(t_2) - i_q(t_1)]\right\} + \frac{\lambda(t_1)\omega_m(t_1)}{\omega_m(t_2)}$$

Embodiment 3

FIG. 1 shows a detection system for detection of a slip rate of an electric vehicle using the above slip rate detection method, comprising a motor rotational speed detection unit 2, a motor voltage detection unit 4 and a motor current detection unit 6, all connected with a drive motor 1, wherein the motor rotational speed detection unit 2, the motor voltage detection unit 4 and the motor current detection unit 6 are connected with a slip rate calculation unit 8 by means of a motor rotational speed signal processing unit 3, a voltage signal processing unit 5 and a current signal processing unit 7, respectively; and the slip rate calculation unit 8 is configured with a slip rate calculation formula; and in this embodiment, the drive motor of the electric vehicle is a DC motor, and the slip rate calculation formula is the above formula (1-10). Moreover, in this embodiment, the slip rate calculation unit also stores motor coefficients of the drive motor and full vehicle constants, wherein the full vehicle constants include full vehicle mass M, wheel radius r, wheel rotational inertial J and transmission ratio a; and the motor coefficients include motor inductance $L_a$, motor torque coefficient $k_m$, motor back electromotive force coefficient $k_e$ and armature resistance $R_a$. In addition, in this embodiment, the voltage detected by the motor voltage detection unit 4 is a motor bus voltage, and the voltage signal processing unit 5 is a signal conditioning unit; and the current value detected by the motor current detection unit 6 is a motor current value, and the current signal processing unit 7 is a signal conditioning unit.

Figure 2:
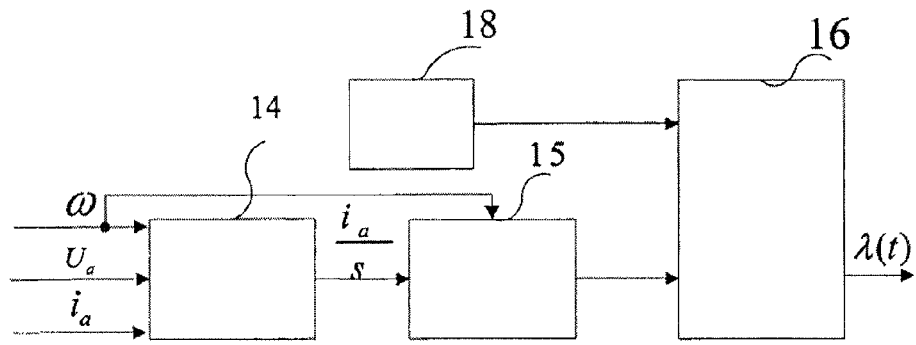
FIG. 2 is a modular block diagram of a slip rate calculation formula.

FIG. 2 is a modular block diagram of the slip rate calculation formula, corresponding to the formula 1-9. The input of the module includes three parameters, the motor rotational speed, the motor voltage and the motor current, and the output is the slip rate $\lambda(t)$. A current integration unit 14 calculates the present current integral value according to the detected rotational speed, voltage and current; a proportionality coefficient 15 is $$\frac{k_m a}{r^2 MR};$$

a constant 18 is $$1 + \frac{J}{r^2 M};$$

and an adder 16 calculates and outputs the present slip rate $\lambda(t)$.

FIG. 3 is a slip rate calculation block diagram after integration on any integral interval (t1, t2), corresponding to the formula 1-10. A calculation unit 17 represents the operation term $$\frac{\lambda(t_1)\omega_M(t_1)}{\omega_M(t_2)};$$

the unit 14 calculates the result of the term $\{\int_t^q U_a dt - k_e \int_{t_1}^{t_2} \omega_m dt - L_a \cdot [i_a(t_2) - i_a(t_1)]\}$ according to the detected rotational speeds, voltages and currents at the time of t1 and t2; and a proportionality coefficient 15 is $$\frac{a^2 \cdot k_m}{r^2 MR_a}.$$

Figure 3A:
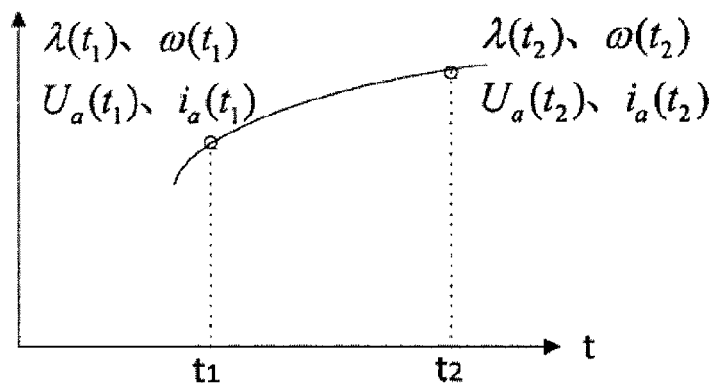
FIG. 3 is a slip rate calculation block diagram after integration on any integral interval (t1, t2)
Figure 3B:
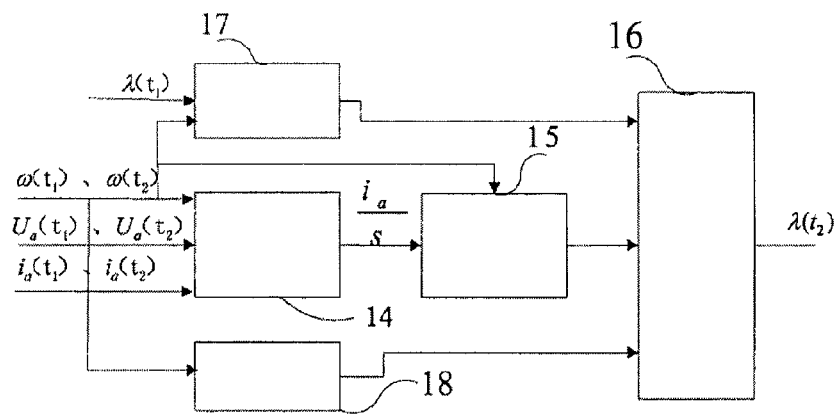

FIG. 3(a) shows the parameters at the time t1 and t2, and FIG. 3(b) is a calculation diagram in the integral interval.

Figure 4A:
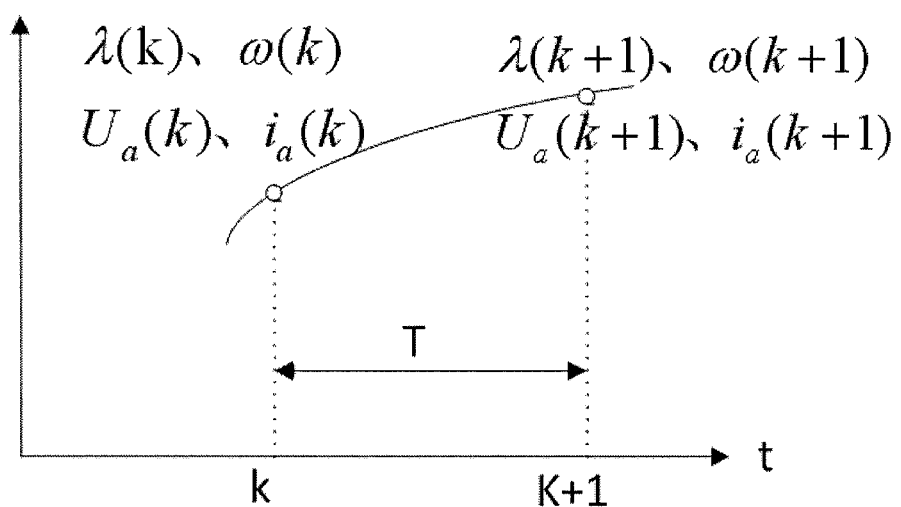
FIG. 4 is a block diagram for calculation of discretized slip rate.
Figure 4B:
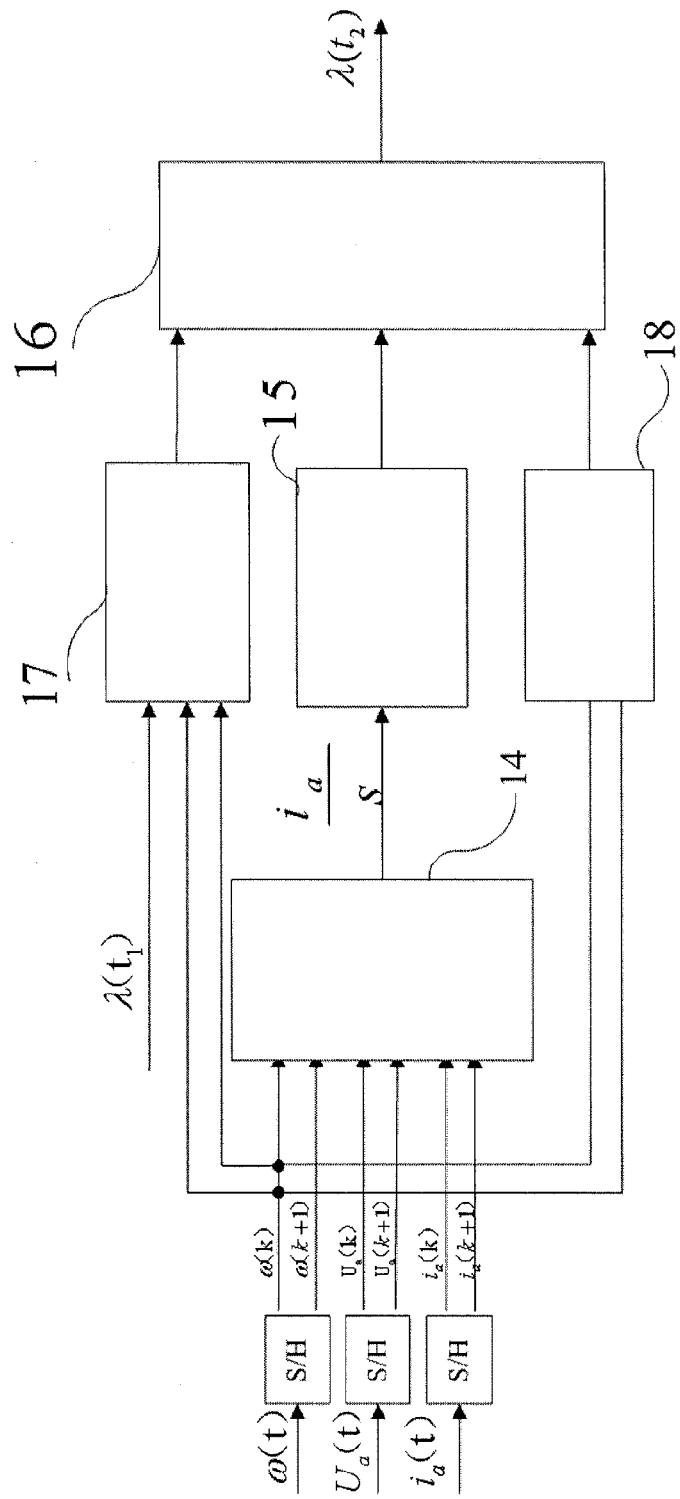

FIG. 4 is a slip rate calculation block diagram after discretization, corresponding to the formula 1-11. FIG. 4(a) shows sampled values and calculated values corresponding to two points continuously sampled, and the sampling interval time between the two points is T; and FIG. 4(b) is a block diagram for implementation of calculation based on discretized real-time slip rate.

Figure 5:
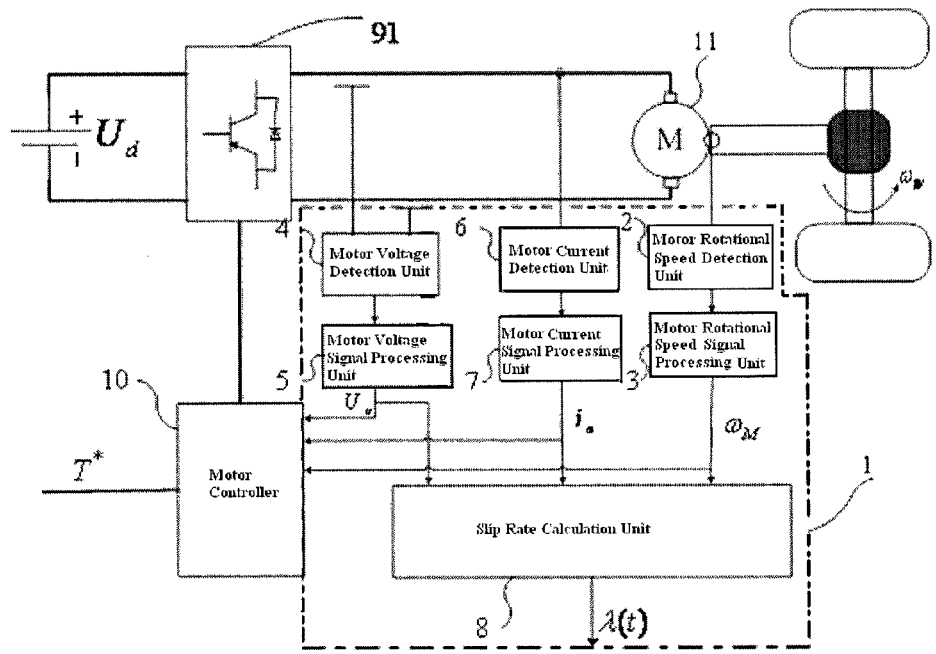
FIG. 5 is a block diagram of a slip rate detection system for a DC motor driven electric vehicle.

The slip rate detection system described in the embodiment can be integrated into a motor controller by means of a software module or an independent hardware circuit module, and the hardware circuit mode is adopted herein. FIG. 5 is a block diagram of a slip rate detection system of a DC motor driven electric vehicle. A motor controller 10 outputs a pulse signal according to present torque requirement and voltage, current and rotational speed feedback values, and drives a DC chopper 91 through a drive circuit, for regulating and controlling the magnitude of the DC voltage. The slip rate detection system calculates the present slip rate $\lambda(t)$ according to the measured voltage, current and rotational speed. In this embodiment, as the drive motor is a DC motor, the voltage signal processing unit 5 is a signal conditioning unit, and the signal conditioning unit performs filtering and amplitude conditioning according to a detected voltage signal so as to meet the requirement of processing in the next step; and the current signal processing unit 7 is a signal conditioning unit, and performs filtering and amplitude conditioning on the detected current signals so as to meet needed signal requirement. Here, the variable information of the voltage, the current, the rotational speed and the like driving the DC motor, after detected by the motor voltage detection unit 4, the motor current detection unit 6 and the motor rotational speed detection unit 2, and after respectively processed by the motor voltage signal processing unit 5, the motor current signal processing unit 7 and the motor rotational speed signal processing unit 3, are transmitted to the slip rate calculation unit 8 for calculation; and as the constant information in the method described in embodiment 1 and the slip rate calculation equation (1-10) are stored in the slip rate calculation unit 8, the particular implementing way of the slip rate calculation equation is as shown in the calculation block diagram of FIG. 4(*b*).

Embodiment 4

Figure 6:
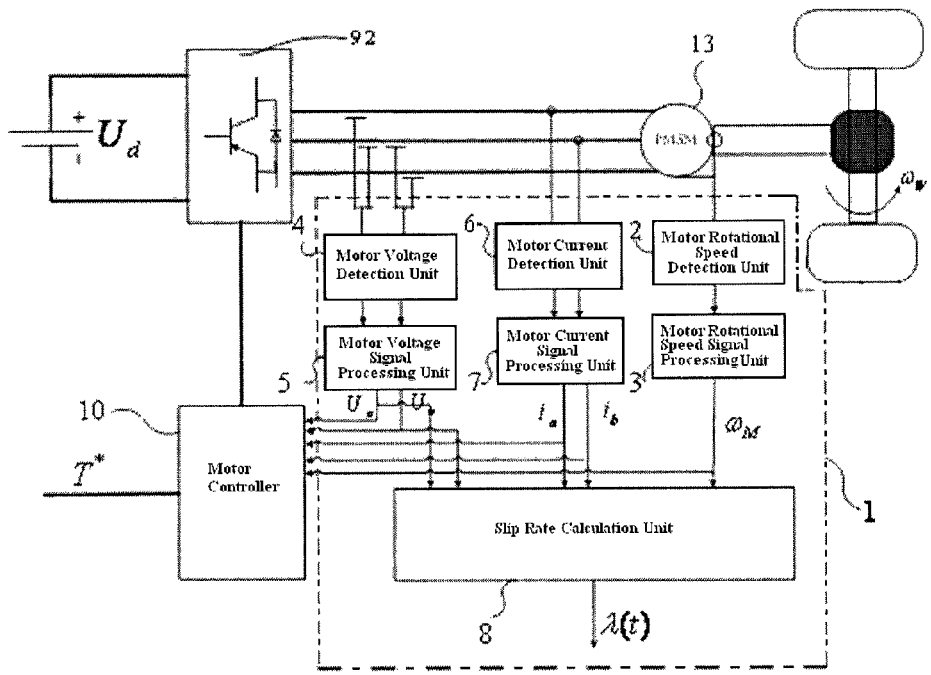
FIG. 6 is a slip rate detection system for an electric vehicle whose drive motor is a permanent magnet synchronous motor.
Figure 7:
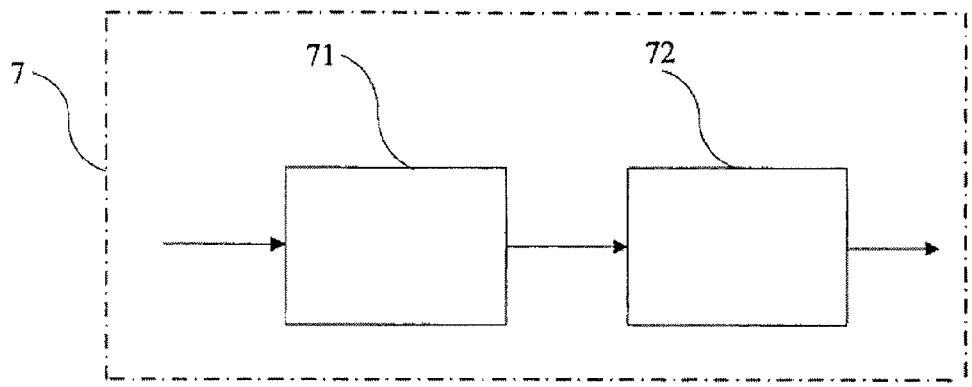
FIG. 7 is a schematic diagram of a current signal processing unit.
Figure 8:
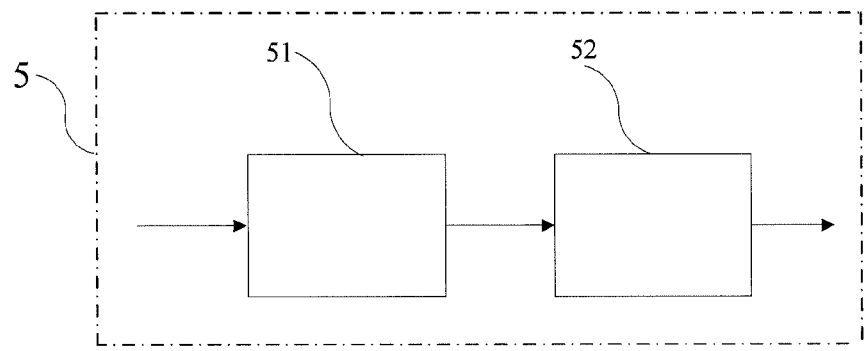
FIG. 8 is a schematic diagram of a voltage signal processing unit.

A slip rate detection system for an electric vehicle whose drive motor is a permanent magnet synchronous motor is given in this embodiment, as shown in FIG. 6. The system comprises a motor rotational speed detection unit 2, a motor voltage detection unit 4 and a motor current detection unit 6, all connected with a drive motor, wherein the motor rotational speed detection unit 2, the motor voltage detection unit 4 and the motor current detection unit 6 are connected with a slip rate calculation unit 8 by means of a motor rotational speed signal processing unit 3, a voltage signal processing unit 5 and a current signal processing unit 7, respectively; and the slip rate calculation unit is configured with a slip rate calculation formula; in this embodiment, the slip rate calculation formula is the formula (2-6) in embodiment 2; and the slip rate calculation unit also stores motor coefficients of the drive motor and full vehicle constants, wherein the full vehicle constants include full vehicle mass M, wheel radius r, wheel rotational inertial J and transmission ratio a; and the motor coefficients include components $L_d$ and $L_q$ of stator inductance of the drive motor in a dq coordinate system, stator resistance $R_s$ of the drive motor, flux linkage $\psi_f$ generated by a permanent magnet of the drive motor, and the number of pole pairs $n_p$ of the drive motor. In this embodiment, the voltage detected by the motor voltage detection unit 4 is a motor line voltage, and the voltage signal processing unit 5 comprises a signal conditioning unit 51 and a voltage transformation unit 52, as shown in FIG. 8; and the current value detected by the motor current detection unit 6 is a motor phase current value, and the current signal processing unit 7 comprises a signal conditioning unit 71 and a current transformation unit 72, as shown in FIG. 7.

As shown in FIG. 6, a motor controller 10 outputs a pulse signal according to present torque requirement and voltage, current and rotational speed feedback values, and drives a three-phase inverter 92 through a drive circuit. A slip rate calculation module 1 calculates the present slip rate λ(t) according to the transformed voltage component, current component and rotational speed. As the drive motor in this embodiment is a permanent magnet synchronous motor, the current signal processing unit 7 comprises the signal conditioning unit 71 and the current transformation unit 72, wherein the signal conditioning unit 71 performs filtering and amplitude conditioning according to the current signals so as to meet the signal requirement of a process, and the current transformation unit 72 performs vector transformation in an abc coordinate system, into a current component in a dq coordinate system, with the conversion equation as shown in the formula (2-4) in embodiment 2; here, the voltage signal processing unit 5 comprises the signal conditioning unit 51 and the voltage transformation unit 52, wherein the signal conditioning unit performs filtering and amplitude conditioning on the detected current signals so as to meet the requirement of next step processing, and voltage transformation unit 52, to transform the linear voltage in the abc coordinate system to a phase voltage, performs vector transformation into a voltage component in the dq coordinate system, as shown in the formula (2-3) in embodiment 2. In this way, physical quantities detected in the detection units, such as 2, 4 and 6, are converted into the physical quantities in forms required by the slip rate calculation unit 8 through the signal processing units, such as 3, 5 and 7, thus implementing the calculation of the slip rate.

The slip rate detection method of this invention is a simple and practical method, and also the detection system for the electric vehicle of this invention is a simple and practical system, because of the simple calculation method, the easy-to-implement detection system and the fast-speed and high-accuracy calculation.

Obviously, the above embodiments are only examples cited for clear description, rather than limitations on the implementing ways. Variations or modifications in other different forms can also be made by those ordinary skilled in the art based on the above description. The implementing ways need not and cannot be exhausted herein. Obvious variations or modifications deriving therefrom are still in the protection scope of the invention-creation.

The invention claimed is:
1. A detection system for detection of a slip rate of a DC motor driven electric vehicle, comprising
   a motor rotational speed detection unit,
   a motor voltage detection unit, and
   a motor current detection unit, all of which are connected with a drive motor;
   wherein,
      said motor rotational speed detection unit, said motor voltage detection unit, and said motor current detection unit are connected with a slip rate calculation unit by means of a motor rotational speed signal processing unit, a voltage signal processing unit, and a current signal processing unit, respectively; and
      said slip rate calculation unit is configured with a slip rate calculation formula,
   wherein the detection system is programmed to perform a slip rate detection method comprising the following steps:
   (1) measuring, using the motor voltage detection unit, the motor current detection unit, and the motor rotational speed detection unit, respectively, voltage, current, and rotational speed of the drive motor to obtain armature voltage $U_a$, armature current $i_a$, and motor rotational speed $\omega_m$ of said drive motor;
   (2) obtaining motor coefficients of said drive motor, wherein the motor coefficients comprise motor inductance $L_a$, armature resistance $R_a$, motor torque coefficient $k_m$, and motor back electromotive force coefficient $k_e$;
   (3) obtaining vehicle constants, wherein the vehicle constants comprise vehicle mass M, wheel radius r, wheel rotational inertia J, and transmission ratio a; and
   (4) obtaining the slip rate according to the slip rate calculation formula shown below:

$$\lambda(t_2) = \left(1 + \frac{J}{r^2 M}\right)\left[1 - \frac{\omega_m(t_1)}{\omega_m(t_2)}\right] - \frac{a^2 \cdot k_m}{r^2 M R_a \omega_m(t_2)}$$

-continued $$\left\{ \int_{t1}^{t2} U_a dt - k_e \int_{t1}^{t2} \omega_m dt - L_a \cdot [i_a(t_2) - i_a(t_1)] \right\} + \frac{\lambda(t_1)\omega_m(t_1)}{\omega_m(t_2)}$$

wherein, $t_1$ is a first measurement time; $t_2$ is a second measurement time; and $\lambda$ is the slip rate.

2. The slip rate detection system of the electric vehicle of claim 1, wherein said slip rate calculation unit also stores the motor coefficients of said drive motor and the vehicle constants.

3. The slip rate detection system of the electric vehicle of claim 2, wherein the voltage measured by said motor voltage detection unit is a motor bus voltage, and said voltage signal processing unit is a signal conditioning unit; and the current measured by the motor current detection unit is a motor current value, and said current signal processing unit is a signal conditioning unit.

4. A detection system for detection of a slip rate of an electric vehicle driven by a permanent magnet synchronous motor, comprising
a motor rotational speed detection unit,
a motor voltage detection unit, and
a motor current detection unit, all of which are connected with a drive motor;
wherein,
said motor rotational speed detection unit, said motor voltage detection unit, and said motor current detection unit are connected with a slip rate calculation unit by means of a motor rotational speed signal processing unit, a voltage signal processing unit, and a current signal processing unit, respectively; and said slip rate calculation unit is configured with a slip rate calculation formula,
wherein the detection system is programmed to perform a slip rate detection method comprising the following steps:
(1) measuring, using the motor voltage detection unit, the motor current detection unit, and the motor rotational speed detection unit, respectively, voltage, current, and rotational speed of a drive motor, to obtain motor rotational speed $\omega_m$, as well as voltage $u_q$ of said drive motor in a dq coordinate system, and armature current $i_q$ of said drive motor in said dq coordinate system;
(2) obtaining motor coefficients of said drive motor, wherein the motor coefficients comprise components $L_d$ and $L_q$ of stator inductance of said drive motor in said dq coordinate system, stator resistance $R_s$ of said drive motor, flux linkage $\Psi_f$ generated by a permanent magnet of said drive motor, and the number of pole pairs $n_p$ of said drive motor;
(3) obtaining vehicle constants, wherein the vehicle constants comprise mass M, wheel radius r, wheel rotational inertia J, and transmission ratio a; and
(4) obtaining the slip rate according to the slip rate calculation formula shown below:

$$\lambda(t_2) = \left(1 + \frac{J}{r^2 M}\right)\left[1 - \frac{\omega_m(t_1)}{\omega_m(t_2)}\right] - \frac{a^2 \cdot k_{m1}}{r^2 M R_s \omega_m(t_2)}$$
$$\left\{ \int_{t1}^{t2} u_q dt - \psi_f \int_{t1}^{t2} \omega_m dt - L_q \cdot [i_q(t_2) - i_q(t_1)] \right\} + \frac{\lambda(t_1)\omega_m(t_1)}{\omega_m(t_2)}$$

wherein, $k_{m1} = n_p[\psi_f + (L_d - L_q)]$; $t_1$ is a first measurement time; $t_2$ is a second measurement time; and $\lambda$ is the slip rate.

5. The slip rate detection system of the electric vehicle of claim 4, wherein the voltage measured by the motor voltage detection unit is a motor line voltage, and the voltage signal processing unit comprises a signal conditioning unit and a voltage transformation unit; and the current measured by the motor current detection unit is a motor phase current value, and the current signal processing unit comprises a signal conditioning unit and a current transformation unit.

6. The slip rate detection system of the electric vehicle of claim 4, wherein said slip rate calculation unit also stores the motor coefficients of said drive motor and the vehicle constants.

* * * * *